United States Patent
Iaccarino

(10) Patent No.: US 9,285,219 B2
(45) Date of Patent: Mar. 15, 2016

(54) TECHNIQUE FOR DETERMINING LOCATION DATA FROM A DATABASE

(71) Applicant: ELEKTROBIT AUTOMOTIVE GmbH, Erlangen (DE)

(72) Inventor: Silvio Iaccarino, Erlangen (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 0 days.

(21) Appl. No.: 14/066,405

(22) Filed: Oct. 29, 2013

(65) Prior Publication Data

US 2014/0121966 A1    May 1, 2014

(30) Foreign Application Priority Data

Oct. 30, 2012   (EP) .................................... 12007418

(51) Int. Cl.
  *G01C 21/00*    (2006.01)
  *G06F 17/30*    (2006.01)
  *G01C 21/36*    (2006.01)

(52) U.S. Cl.
  CPC ............ *G01C 21/00* (2013.01); *G01C 21/3611* (2013.01); *G01C 21/3614* (2013.01); *G06F 17/30241* (2013.01)

(58) Field of Classification Search
  CPC ............... G01C 21/00; G01C 21/3614; G01C 21/3611; G06F 17/30241
  See application file for complete search history.

(56) References Cited

U.S. PATENT DOCUMENTS

2001/0041961 A1*  11/2001  Feigen ......................... 701/209
2012/0036150 A1    2/2012  Richter et al.

FOREIGN PATENT DOCUMENTS

DE    19941974 A1    3/2001
DE    69830631 T2    5/2006
DE    19929425 B4    3/2012

OTHER PUBLICATIONS

European Search Report for EP12007418, Mailing Date of Apr. 2, 2013.

* cited by examiner

*Primary Examiner* — John Q Nguyen
*Assistant Examiner* — Michael Kerrigan
(74) *Attorney, Agent, or Firm* — Westerman, Hattori, Daniels & Adrian, LLP

(57) ABSTRACT

A technique for determining location data from a database is presented. A method implementation of that technique comprises receiving a first user input defining an extension of a search corridor relative to a map visualized on a display unit. The search corridor extends from a first map area to a second map area spaced apart from the first map area. In response to a second user input defining one or more characters, location data are determined of at least one location associated with the one or more characters and lying within the search corridor. The technique may be used for searching for an intermediate or target location in connection with calculating a route.

16 Claims, 8 Drawing Sheets

TECHNIQUE FOR DETERMINING LOCATION DATA FROM A DATABASE

TECHNICAL FIELD

The present disclosure generally relates to the field of determining location data from a database responsive to a user input. The location data may be processed for various purposes such as route calculation and provisioning of location-based services.

BACKGROUND

Many modern electronic devices process location data such as location names and geographic coordinates of locations. As an example, navigation devices are configured to calculate a route from a start location to a target location based on geographic coordinates of the locations involved. The geographic coordinates of the start location are typically derived from the output of a positional sensor. The geographic coordinates of the target location, on the other hand, can be determined based on user input.

Some navigation devices are configured to prompt a user for characters that identify a name of the target location. The navigation device then determines matches between the characters input by the user and location names in a database and presents the matching location names for target location selection. When the user confirms a presented location name as target location, the navigation device retrieves geographic coordinates associated therewith as input for a route calculation algorithm.

The search for target locations based merely on location names is cumbersome in various respects. Often, there exist multiple locations with the same target name. In such cases the name search has to be complemented by other identifiers such as the ZIP code of the desired target location. That ZIP code may, however, not be known to the user. Moreover, conventional databases covering whole countries or even continents contain a larger number of location names. As such, the character matching operation is time consuming, which leads to an unsatisfying user experience.

DE 199 29 425 A teaches a navigation device with an improved target location selection function. Here, a user is permitted to move a rectangular frame along predefined fields on a visualized map. When the frame has been moved to a map field that comprises the target location and when the user has confirmed the frame position, the location names of all locations lying within the selected map field are determined from a database and listed next to the visualized map. The user may then either select one of the listed location names using a cursor or, alternatively, input one or more characters. In response to a character input, the list is thinned out to location names starting with such characters. The thinned out list is again presented to the to user for target location selection.

SUMMARY

There exists a need for a technique that facilitates the determination of location data from a database responsive to a user input.

According to a first aspect, a method of determining location data from a database is provided, wherein the method comprises receiving a first user input defining an extension of a search corridor relative to a map visualized on a display unit, wherein the search corridor extends from a first map area to a second map area spaced apart from the first map area, and determining, in response to a second user input defining one or more characters, location data of at least one location associated with the one or more characters and lying within the search corridor.

Generally, a location may be an entity (on the map and/or in reality) for which associated location data exist. The location may take the form of a populated entity (e.g., a city, village, place, etc.), a Point of Interest (POI) (e.g., a specific sight, restaurant or store) or any other point-like or extended site.

The location data may take the form of location names or of geographic coordinates of locations. Additionally, the location data may comprise both the names and the geographic coordinates of the locations. The names and the geographic coordinates may be stored in the same or in different data structures, and in the same or in different databases. For a specific location, its name and its geographic coordinates may be associated (e.g., linked) with each other. As an example, the name of a location may permit to retrieve its geographic coordinates (and/or vice versa). The location data may be unique (such as geographic coordinates), non-unique (such as location names) or partially unique and partially non-unique (e.g., a combination of a location name and associated geographic coordinates).

The location data may be determined for various purposes. According to one variant, the location data are used for calculating a route that comprises the at least one location associated with said location data. The calculated route may comprise the location as one of a start location, a target location, and a POI. Alternatively, or in addition, the calculated route may comprise the location as an intermediate location between a start location and a target location.

Once determined, the location data, or information derived therefrom, may be presented to the user for confirmation in a first step. The user may be requested in an optional second step to identify the nature of the confirmed location data for route calculation purposes (e.g., to differentiate whether the location is to be used as a target location or as an intermediate location).

The extension of the search corridor may roughly define at least a portion of the route to be calculated. As an example, one end of the search corridor in the first map area may roughly cover the start location. Additionally, or alternatively, the opposite end of the search corridor in the second map area may roughly cover the target location. An optional intermediate location may lie within the search corridor in an intermediate map area between the first map area and the second map area. In one implementation, when the at least one location is an intermediate location, the calculated route may be permitted to extend outside the search corridor as long as the intermediate location lies within the search corridor. In this implementation, one or both of the start location and the target location may thus lie outside the search corridor.

The first user input may be received in various ways. As an example, receiving the first user input may comprise detecting a movement defining a trace on the display unit relative to the visualized map. In the case of a display unit that is configured as a touchscreen, the trace may be defined by a pointing device (e.g., a stylus or the user's finger). In alternative configurations, the trace may be defined by moving a cursor on the display unit (e.g., using a joystick or arrow keys). The extension of the search corridor from the first map area to the second map area may be determined from the trace. This determination may comprise a transformation of the trace from display coordinates into geographic coordinates. The search corridor underlying the determining step may be defined in geographic coordinates.

As explained above, the search corridor has a user-defined extension from the first map area to the second map area. The search corridor may additionally have a corridor width in a dimension generally perpendicular to the corridor extension. The corridor width may be smaller than the extension of the search corridor from the first map area to the second map area. That is, the search corridor may have the general appearance of a (e.g., thick) line. Both, the corridor width and the corridor extension may be defined in geographic coordinates.

The corridor width may have a fixed size or may be adjustable. In one implementation, the corridor width is adjusted depending on a scale of the map visualized on the display unit. Such an adjustment may be performed automatically. Additionally, or as an alternative, the corridor width may be adjustable by the movement that defines the trace on the display unit relative to the visualized map. In this regard, the corridor width may, for example, be adjustable by at least one of a velocity of the movement, a pressure on the display unit (e.g., when configured as a touchscreen) accompanying the movement, and an area of the visualized map effected by the movement (e.g., moving one or more fingers on the touchscreen).

The search corridor may be visualized on the display unit relative to the visualized map. In case the location data are used for route calculation purposes, the calculated route may be visualized on the display unit in addition to the search corridor.

In one implementation, the location data comprise at least location names. In the determining step, the location names may be determined based on one or more data structures in the database. The one or more data structures may be configured to arrange the location names in accordance with their character sequences. As an example, the one or more data structures may comprise one or more Next Valid Character (NVC) trees.

In certain configurations, a set of data structures may be provided. The determination of the location names may in this case comprise selecting, from the set of data structures, one or more data structures based on the search corridor, and searching the one or more selected data structures for at least one location name that comprises the one or more characters (e.g., at the start and/or any other position of the location name).

In some configurations, the map may comprise multiple map regions. The map regions may be overlapping or non-overlapping. Further, they may be associated with individual data structures. As an example, there may be a mapping between individual map regions and individual data structures. The mapping may define a 1:1, n:1 or 1:n relationship between map regions and data structures. In such a configuration, the step of selecting the one or more data structures may comprise identifying one or more map regions based on the search corridor (e.g., to select map regions overlapping or at least partially lying within the search corridor), and identifying, from the set of data structures, one or more data structures associated with the one or more identified map regions.

Generally, searching the one or more selected data structures may comprise a filtering for location names of locations that lie within the search corridor. Such a filtering may at least partially be based on the one or more characters defined by the second user input.

The search corridor may stretch within a single country or may stretch from a first country into a second country (optionally via one or more intermediate countries). In one variant, the determination of the location data is restricted to locations in the second country. Alternatively, the determination of the location data is performed in both the first country and the second country (and any intermediate country).

Also provided is a computer program product comprising program code portions for performing the method presented herein when the computer product is executed on one or more computing devices. The computer program product may be stored on a computer readable recording medium. Moreover, the computer program product may be provided for download via a wireless or wired network.

According to a still further aspect, a device for determining location data from a database is provided, wherein the device comprises an interface configured to receive a first user input defining an extension of a search corridor relative to a map visualized on a display unit, wherein the search corridor extends from a first map area to a second map area spaced apart from the first map area, and a processor with access to the database, wherein the processor is configured to determine, in response to a second user input defining one or more characters, location data of at least one location associated with the one or more characters and lying within the search corridor.

The device may optionally also comprises the database. The database may be configured as a map database (e.g., as used for route calculation purposes). The map database may comprise map information, including location names, geographic coordinates of the locations and optional further information.

A navigation device is also provided. The navigation device comprises a device for determining location data as presented herein and the database in the form of a map database. The navigation device may have, as part of the interface, a display unit in the form of a touchscreen. The touchscreen is configured to receive at least the first user input from a movement thereon. The navigation device may be a portable device or a vehicle-based built-in device.

BRIEF DESCRIPTION OF THE DRAWINGS

Various embodiments of the technique presented herein will be described below with reference to the accompanying drawings, in which.

DETAILS OF THE DESCRIPTION

In the following description, for purposes of explanation and not limitation, specific details are set forth in order to provide for a thorough understanding of the technique presented herein. It will be apparent to one skilled in the art that this technique may be practised in other embodiments that depart from these specific details. For example, the embodiments will primarily be described in the context of a vehicle-based navigation device; however, this does not rule out the use of the present technique in other embodiments, such as stationary route planning or provisioning of location-based services (such as weather forecasts) for user-selectable locations.

Moreover, those skilled in the art will appreciate that the services, functions and steps explained herein may be implemented using software functioning in conjunction with the programmed microprocessor, using an Application Specific Integrated Circuit (ASIC), a Digital Signal Processor (DSP) or general purpose computer. It will also be appreciated that while the following embodiments are primarily described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
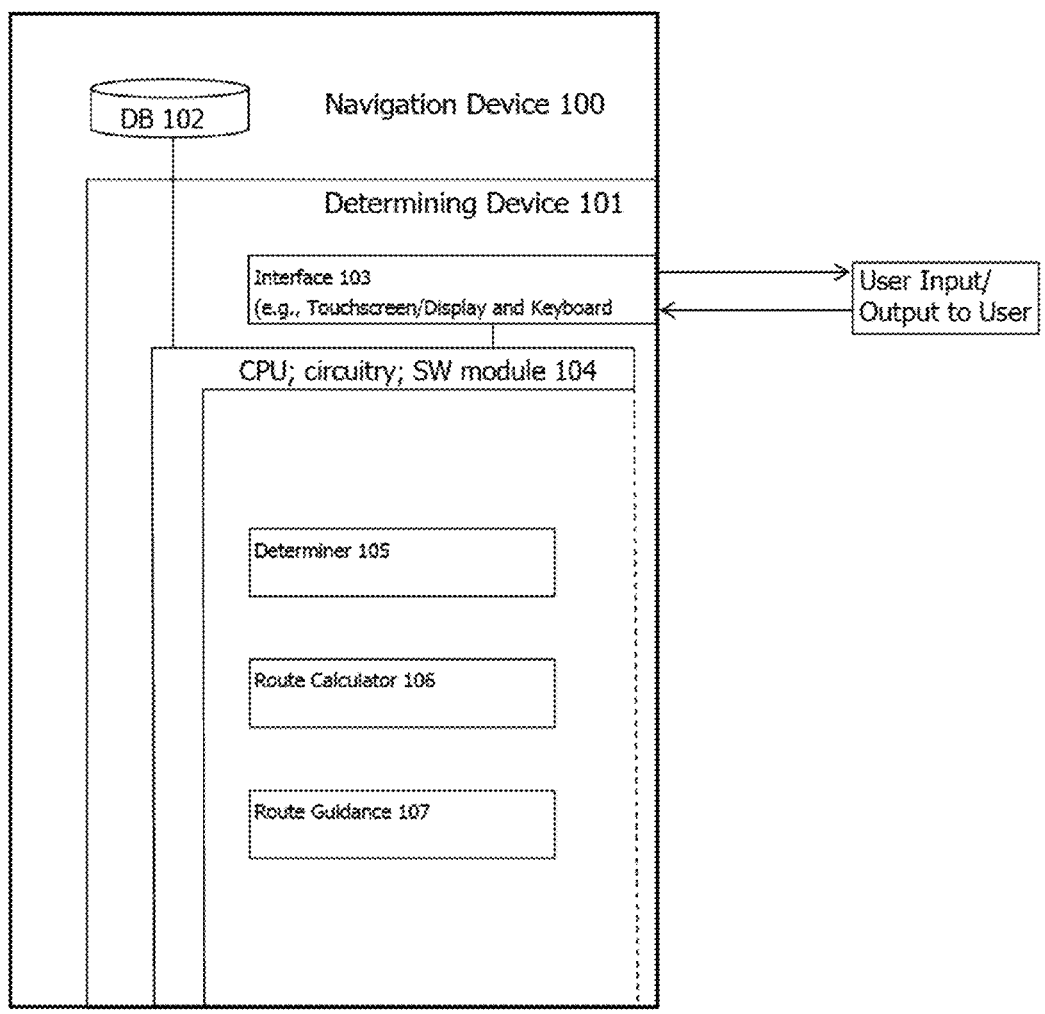
FIG. 1 illustrates an embodiment of a navigation device.

FIG. 1 illustrates an exemplary navigation device 100 incorporating an embodiment of a determining device 101. The determining device 101 is configured to determine location data from a database 102. In the exemplary realization illustrated in FIG. 1, the database 102 is a map database of the navigation device 100. In other realizations, the database 102 may be realized outside the navigation device 100 to be accessible by the determining device 101 via a wired or wireless connection.

As illustrated in FIG. 1, the determining device 101 comprises an interface 103 as well as a core functionality 104. The interface 103 is configured to receive user input and to present device output to a user. In one implementation, the interface 103 may be realized as a touchscreen. In other implementations, the interface 103 may comprise a display unit and a separate keyboard or joystick. The interface 103 may further comprise a loudspeaker. These interface realizations may also be combined as needed.

The core functionality 104 can be realized as one or more of a Central Processing Unit (CPU), dedicated circuitry or a software module. The core functionality 104 comprises a determiner 105, a route calculator 106 as well as a route guidance 107. The entities 105, 106 and 107 may be disposed (e.g., as separate software modules) within a memory (not shown) of the navigation device 100 to be processed by a CPU implementation of the core functionality 104.

As explained above, the interface 103 is, inter alia, configured to receive user input. In the context of the present embodiment, the interface 103 is specifically configured to receive a first user input defining an extension of a search corridor relative to a map. The map is visualized on a display unit of the interface 103.

The determiner 105 is configured to determine location data of at least one location lying within the search corridor. In this regard, the determiner 105 operates on the basis of a further user input received via the interface 103 and defining one or more characters. The determiner 105 is configured to "filter" the location data in the database 102 to determine location data of such locations that are associated with the one or more characters (e.g., that comprise the one or more characters in their location names) and that additionally lie within the search corridor previously defined by the user.

The route calculator 106 is configured to calculate a route based on the location data determined by the determiner 105. The route calculated by the route calculator 106 comprises the at least one location for which the location data has been determined as one of a start location, a target location, an intermediate location between a start location and a target location, and a POI. Before starting route calculation by the route calculator 106, the user may be prompted to confirm, or select, via the interface 103 a specific location for which location data have been determined. Such a confirmation is particularly useful in case location data of multiple locations have been determined by the determiner 105. Optionally, the user may further be prompted to define the nature of the confirmed location for route calculation purposes (e.g., to select between two or more of a start location, a target location, an intermediate location and a POI).

In case the confirmed location is selected to be an intermediate location, the route calculated by the route calculator 106 may be permitted to extend outside the search corridor (as long as the intermediate location lies within the search corridor). As will be appreciated, the target location may be selected in a similar manner as the intermediate location. The start location may be determined via a positional sensor (not shown) of the navigation device 100. The positional sensor may, for example, be configured as a Global Positioning System (GPS) sensor or as any other sensor for satellite-based positioning.

Still referring to FIG. 1, the route guidance 107 is configured to generate visual and/or acoustic manoeuvre commands to guide a user along the route calculated by the route calculator 106. The manoeuvre commands (such as graphical arrows and/or spoken instructions) will be output the user via the interface 103.

The operation of the navigation device 100 and of the determining device 101 of FIG. 1 will now be described in more detail with reference to a specific embodiment illustrated in FIGS. 2A to 2F and 3A to 3C. FIGS. 2A to 2G illustrate screenshoots of the visualized content of a touchscreen implementation of the interface 103 in connection with a complete route calculation embodiment. FIG. 3A shows a flow diagram 300 of a method embodiment for determining and presenting location data from the database 102, FIG. 3B illustrates an exemplary NVC tree used in connection with the method embodiment illustrated in FIG. 3A, and FIG. 3C depicts a mapping between map areas and NVC tree sets. The method embodiment may be performed by the determining device 101 of FIG. 1.

Figure 2A:
FIGS. 2A-2G illustrate screen shots for a route calculation embodiment.
Figure 2B:
Figure 2C:
Figure 2D:
Figure 3A:
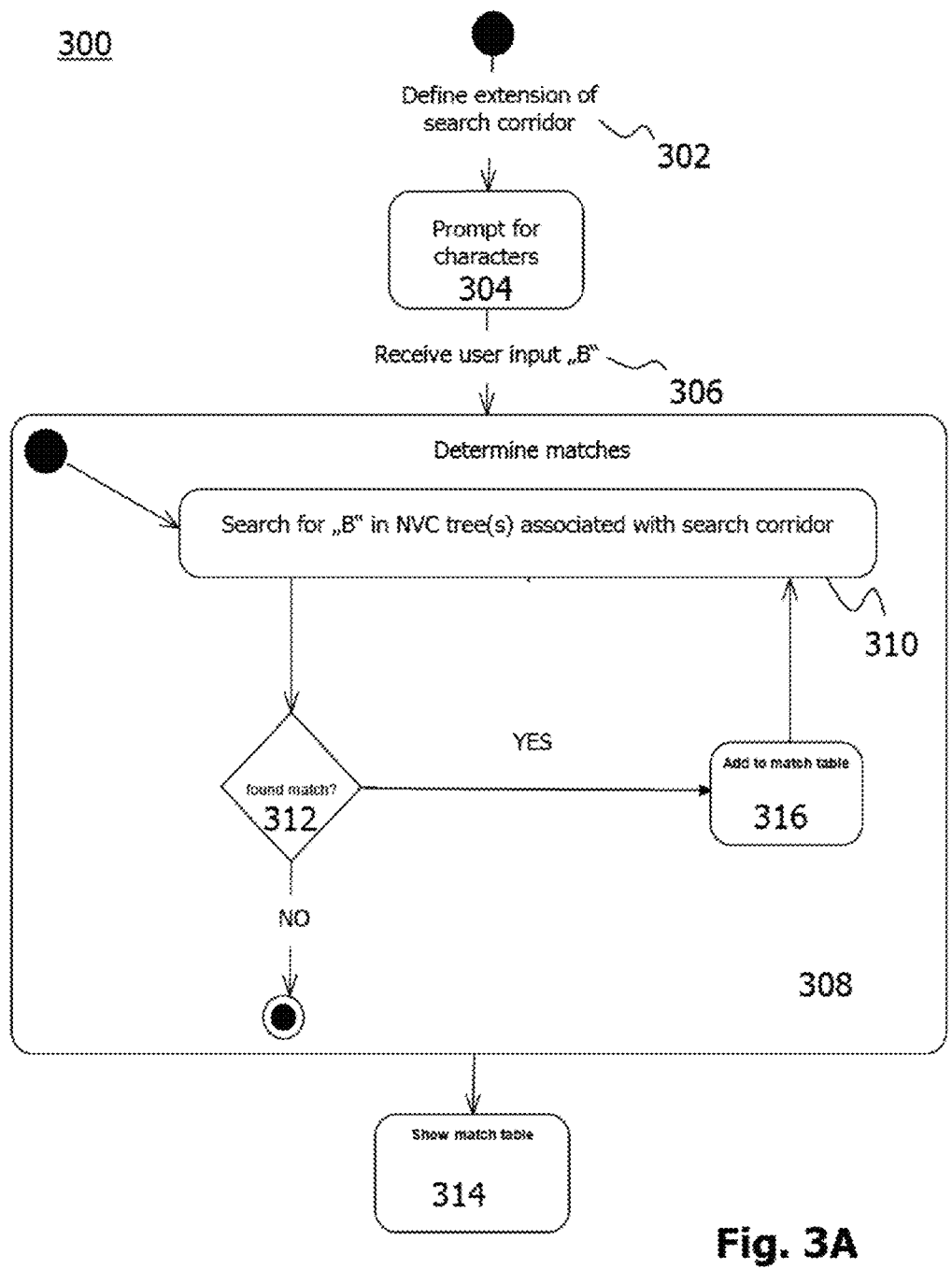
FIG. 3A illustrates a flow diagram of a method embodiment.
Figure 3B:
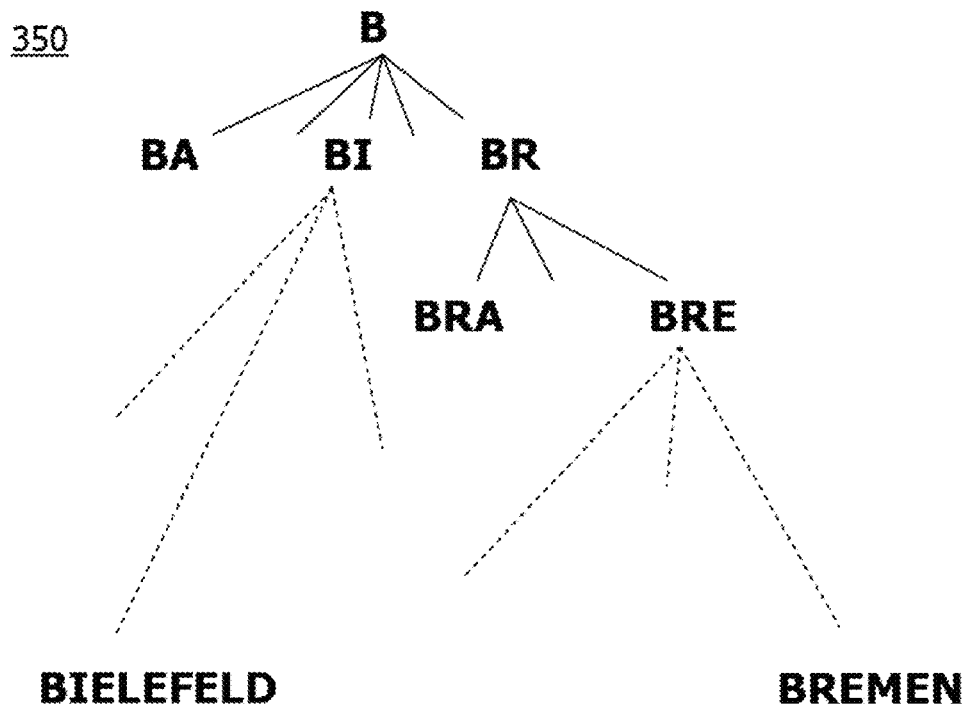
FIG. 3B illustrates an embodiment of an NVC tree.
Figure 3C:
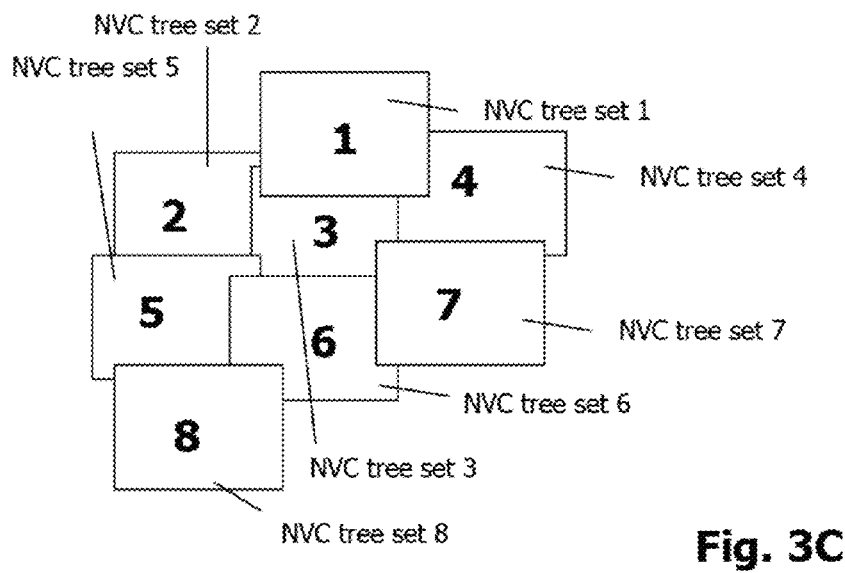
FIG. 3C illustrates an embodiment of a mapping between map regions and NVC tree sets.

FIG. 2A shows an initial route calculation screen presented to a user on the interface 103. The screen illustrated in FIG. 2A visualizes a map of central Europe. The user now has the possibility to input a search corridor relative to the visualized map. As shown in FIGS. 2B to 2D, the extension of the search corridor is defined by moving a finger on the touchscreen of the interface 103 from a first map area to a second map area spaced apart from the first map area. The extension of the search corridor will roughly define the route to be calculated (or at least a portion thereof).

Upon moving the finger from the first map area (in the Hamburg region) to the second map area (in the Köln region) as shown in FIGS. 2B to 2D, a trace will be defined on the touchscreen relative to the visualized map. From that trace the extension of the search corridor can be determined. This determination typically involves transforming the coordinates of the trace, which will first be available in a coordinate system of the touchscreen, into geographic coordinates representative of the extension of the search corridor in a longitudinal direction.

In addition to its longitudinal extension, the search corridor has a width perpendicular thereto. The corridor width may be fixed or adjustable. As an example, the corridor width may be automatically adjusted based on the scale of the visualized map. Alternatively, or in addition, the corridor width may be adjustable by the user via user settings or in connection with the movement defining the trace. As an example, the corridor width may be adjustable by of a velocity of the movement (e.g., a lower velocity corresponds to a larger corridor width) or a pressure on the touchscreen accompanying the movement (e.g., a higher pressure corresponds to a larger corridor width). As a further example, the user may use two or more fingers for adjusting a larger corridor width by defining a larger area of the visualized map affected by the movement. In this regard the touchscreen of the interface 103 may have multi-touch capabilities.

The screen shot of FIG. 2D illustrates that the search corridor will be displayed relative to (i.e., on top of) the visualized map. The corridor width is substantially smaller than the extension of the search corridor from the Hamburg area to the Köln area. While in FIG. 2D the search corridor has a substantially straight extension, it will be appreciated that the user could have also defined a search corridor with a curved or wiggly extension. Such curved or wiggly extensions will in particular be used to cover intermediate locations for the route to be calculated.

The following steps of determining location data from the database 102 based on the search corridor of FIG. 2D will now be described with additional reference to the flow diagram 300 of FIG. 3A. The method illustrated in FIG. 3A starts in step 302 by defining the search corridor, i.e., its extension and, optionally, its width, as explained with reference to FIGS. 2A to 2C. The corridor width may initially be defined in screen coordinates and then be transformed into geographic coordinates. Alternatively, the corridor width may directly be defined in geographic coordinates. The corridor width could also be defined in distance units (e.g., in kilometers or miles) to be applied on both sides of the longitudinal extension of the search corridor. Eventually, the search corridor will have the form of a user-defined area in geographic coordinates. That area could be expressed as a polygon defined by a plurality of boundary points in geographic coordinates.

Once the search corridor has been defined in step 302, the user is prompted in step 304 to input one or more characters. To this end a dedicated screen will be presented to the user as will be discussed below. In the present embodiment it will be assumed that the user inputs the character "B" in the appropriate input field (step 306).

Figure 2E:
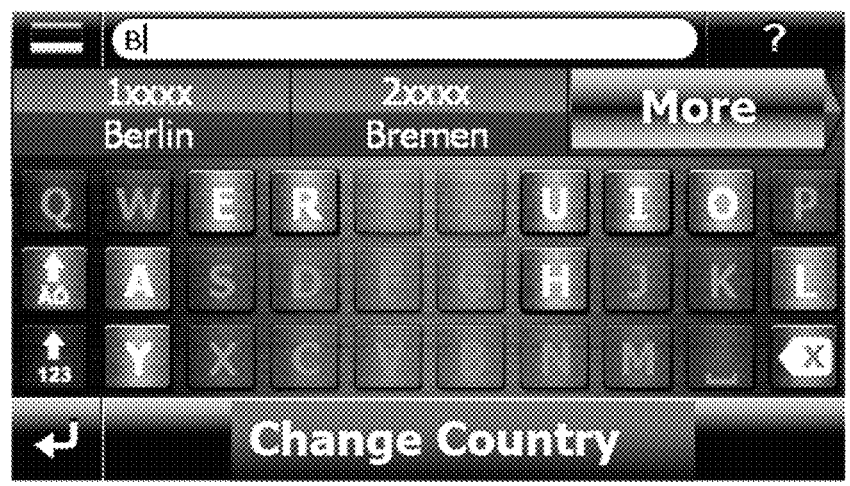

Responsive to such a user input, a conventional navigation device would search the location data of a whole country or continent for matches. If, for example, a country setting of the navigation device has been adjusted to Germany and a user has entered the character "B", the conventional navigation device would present the location names of the largest German cities that start with "B". In this regard, as illustrated in the screen of FIG. 2E, Berlin would be presented first, followed by Bremen and so on.

Clearly, a user wishing to travel from Hamburg to Köln as depicted in FIG. 2D is not interested in being offered Berlin as intermediate or target location. For this reason the present embodiment implements a different approach for determining the location data to be presented to the user. That is, location data matching the input characters are not "blindly" determined as illustrated in FIG. 2E, but the search corridor previously defined by the user is additionally taken into account as will now be discussed in more detail with reference to step 308 of the flow diagram 300.

Step 308 illustrates the determination of location data matching the user's character input and additionally lying within the user-defined search corridor. The determining step 308 is performed by the determiner 105 of FIG. 1. The processes performed in connection with step 308 are based on data structures in the database 102 that arrange the location names in accordance with their character sequences. Such data structures may take the form of NVC trees. An example of such an NVC tree 350 is illustrated in FIG. 3B.

FIG. 3B shows an NVC tree 350 with the initial character "B" at its root node. The leaf nodes of the NVC tree 350 are represented by location names starting with the character "B", such as Bielefeld and Bremen. The intermediate nodes between the root node and the leaf nodes correspond to character sequences of increasing lengths that finally terminate in the character sequences of the location names.

For the purpose of route calculation, the leaf nodes of the NVC tree 350 may not only contain location names, but also the associated geographic coordinates of the corresponding locations (not shown in FIG. 3B). Alternatively, each leaf node may be linked with, or point to, associated geographic coordinates. Those coordinates will in most cases also be stored in the database 102 together with the NVC trees.

In the present embodiment, larger maps are divided into a plurality of (virtual) map regions (each having, e.g., a size between 100 $km^2$ and 10.000 $km^2$). Individual map regions are associated in the database 102 with individual NVC trees or NVC tree sets as illustrated in FIG. 3C. Each individual NVC tree set comprises the NVC trees with location names of all locations located in the associated map region. As understood herein, an NVC tree set comprises multiple trees with different characters as root nodes (i.e., one NVC tree for the character "A", another NVC tree for the character "B", and so on).

The predefined mapping between map regions and NVC tree sets as illustrated in FIG. 3C facilitates the search for matching location data based on the user-defined search corridor as generally illustrated by step 310 in flow diagram 300. To this end, based on the geographic coordinates of the user-defined search corridor, one or more map regions at least partially covering or lying within that search corridor are identified. For the map regions thus identified, the NVC tree sets associated therewith are identified in a next step. The identified NVC tree sets are then searched, or filtered, based on the one or more characterize input by the user. Thus, the identified NVC trees are searched for location names matching the one or more input characters.

Figure 2F:

From step 310 the method proceeds to step 312 to identify if a match has been found. If no matching location name could be found, step 308 ends and an empty match table is presented to the user in step 314. Otherwise, if a matching location name has been found, the location name is added to the match table in step 316 and the search in step 310 is continued until no further match is found. In case the match table is found to comprise multiple matches, all matches, or a subset thereof, are presented to the user as illustrated in FIG. 2F. It will be appreciated that steps 306 and 308 can be repeated as needed should the user wish to thin out the match table by inputting one or more further characters.

For the exemplary scenario illustrated in FIG. 2D of a search corridor extending from the Hamburg area to the Köln area, map regions 1, 3, 5 and 6 in FIG. 3C may be identified as having an at least partial overlap with the corresponding search corridor. So when the user enters the character "B" in step 306, the NVC trees with the root node "B" of the associated NVC trees 1, 3, 5 and 6 will be retrieved from the database 102 and searched, or filtered, for matching location names. Any matching location names are sorted in a predefined order (e.g., from larger cities to smaller cities) and then presented on the touchscreen as illustrated in FIG. 2F.

When comparing the conventional approach illustrated in FIG. 2E with the screen of FIG. 2F it becomes apparent that Berlin is no longer presented (as Berlin does not lie within the search corridor). On the other hand, the city of Bielefeld is now presented in addition to the (larger) city of Bremen.

On the screen of FIG. 2F, some or all of the matching location names, if any, are presented to the user for confirmation. Should the user, in the scenario illustrated in FIG. 2D, wish to calculate a route from Hamburg to Köln via Bremen, the user may simply confirm Bremen on the touchscreen. On a next screen (not illustrated), the user is prompted to specify whether Bremen is to be the target location for route calculation or an intermediate location. In the present embodiment, the user confirms Bremen to be an intermediate location. The user may then repeat steps 304 to 316 illustrated in FIG. 3A to select Köln as the target location. The start location, in the present embodiment Hamburg, is simply determined based on the reading of a positional sensor as generally known in the art.

Figure 2G:
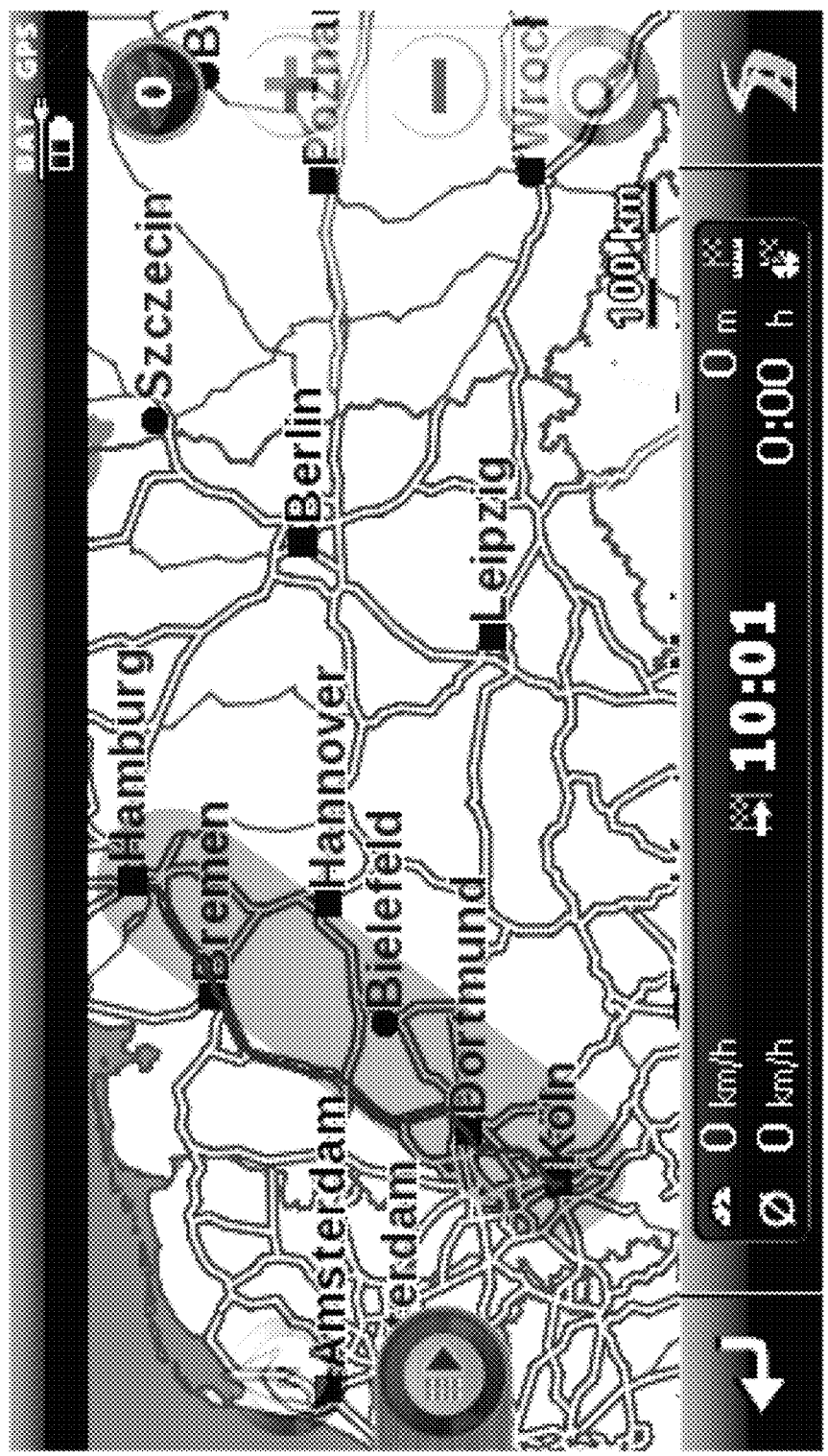

For route calculation purposes, the geographic coordinates associated with Hamburg, Bremen and Köln will then be retrieved from the database 102 (e.g., via a link from the associated location names in the NVC trees). Using the geographic coordinates of Hamburg as the start location, Bremen as an intermediate location and Köln as the target location, the route calculator 106 will calculate a route as illustrated in the screen of FIG. 2G. As shown in FIG. 2G, the route is permitted to extend outside the search corridor, but the start location Hamburg, the intermediate location Bremen and the target location Köln all lie within the search corridor. The search corridor thus only roughly defines the route to be calculated. Once the calculated route as presented on the screen of FIG. 2G is confirmed by the user, route guidance 107 becomes active to guide the user from Hamburg via Bremen to Köln using visual and acoustic route guidance commands, as generally known in the art.

The technique presented herein is particularly beneficial in case a route stretching between two or more countries is to be calculated. In such a case a user conventionally had to preselect individual countries for the target location search. Such a preselection can be omitted when implementing the technique presented herein, as will now be described in more detail with reference to the screenshots of FIGS. 4A to 4D. Here, it is assumed that the user is interested in a route from Berlin (Germany) to Paris (France).

Figure 4A:
FIGS. 4A-4D illustrate screen shots for an embodiment of determining location data across multiple countries.
Figure 4B:

In a first stage illustrated in FIGS. 4A and 4B, the user again defines a search corridor as generally discussed above. In the present case the search corridor stretches from Berlin to Paris as shown in FIG. 4B.

Figure 4C:
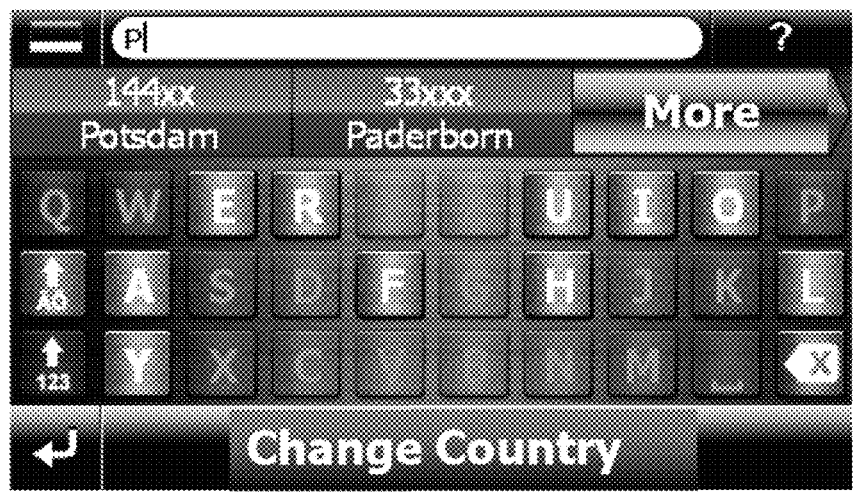

Conventionally, if the user wishing to travel to Paris inputs the character "P" to search for Paris as target location (but without having changed the country settings from Germany to France), the screen of FIG. 4C is presented to the user. As shown in FIG. 4C, only German cities starting with the character "P" such as Potsdam are presented for user confirmation.

Figure 4D:

According to the technique presented herein, a search corridor stretching between two or more countries will automatically cause the determiner 105 to also consider map regions outside Germany but still lying within the search corridor when searching for location names (as explained above with reference to FIG. 3C). As a result, when entering the character "P" in connection with a location search, the determiner 105 will also consider locations outside Germany (but lying within the search corridor) without having to manually adjust the country settings. Therefore, as illustrated in the screen of FIG. 4D, the user can readily confirm Paris on that screen as target location, or, if desired, as intermediate location.

While the above embodiments have primarily been described in connection with determining location data for the purpose of selecting an intermediate or target location, it will be appreciated that similar approaches may be used to select a POI along a route. Such a POI may, for example, be a gas station, a restaurant, and so on. Moreover, while the above embodiments relate to route calculation in a navigation device, the technique presented herein may also be implemented in other types of devices and for other purposes.

It is believed that the advantages of the technique presented herein will be fully understood from the foregoing description, and it will be apparent that various changes may be made in the form, construction and arrangement of the exemplary aspects thereof without departing from the scope of the invention or without sacrificing all of its advantageous effects. Because the technique presented herein can be varied in many ways, it will be recognized that the invention should be limited only by the scope of the claims that follows.

The invention claimed is:

1. A method of determining location data from a database, the method comprising:
   displaying a map on a display unit;
   receiving a first user input in form of a movement of a stylus, a user's finger, or a cursor from a first map area to a second map area spaced apart from the first map area, the movement being a line-shaped trace having a longitudinal extension;
   defining an extension of a search corridor relative to the displayed map based on the longitudinal extension of the line-shaped trace and by adjusting a corridor width perpendicular to the longitudinal extension based on a velocity of the movement or a pressure on the display unit accompanying the movement; and
   determining, in response to a second user input defining one or more characters, location data of at least one location associated with the one or more characters and lying within the search corridor, wherein the determined location data is displayed.

2. The method of claim 1, further comprising
   calculating, based on the location data thus determined, a route that comprises the at least one location as one of a start location, a target location, a Point of Interest, and an intermediate location between a start location and a target location.

3. The method of claim 2, wherein
   the extension of the search corridor roughly defines at least a portion of the route to be calculated, wherein the at least one location is an intermediate location and wherein the calculated route is permitted to extend outside the search corridor as long as the intermediate location lies within the search corridor.

4. The method of claim 1, wherein
   receiving the first user input comprises detecting the movement defining the line-shaped trace on the display unit relative to the visualized map, and determining the extension of the search corridor from the trace.

5. The method of claim 1, further comprising
   displaying the search corridor on the display unit relative to the displayed map.

6. The method of claim 1, wherein
   the location data comprise at least location names and wherein the location names are determined based on one or more data structures in the database that arrange the location names in accordance with their character sequence.

7. The method of claim 6, wherein
   the one or more data structures comprise one or more Next Valid Character, or NVC, trees.

8. The method of claim 7, wherein
   determining the location names comprises:
   selecting, from a set of data structures, one or more data structures based on the search corridor; and searching the one or more selected data structures for at least one location name that comprises the one or more characters.

9. The method of claim 6, wherein determining the location names comprises:
   selecting, from a set of data structures, one or more data structures based on the search corridor; and
   searching the one or more selected data structures for at least one location name that comprises the one or more characters.

10. The method of claim 9, wherein the map comprises multiple map regions and wherein individual map regions are associated with individual data structures, and wherein selecting the one or more data structures comprises:
    identifying one or more map regions based on the search corridor; and
    identifying, from the set of data structures, one or more data structures associated with the one or more identified map regions.

11. The method of claim 10, wherein searching the one or more selected data structures comprises a filtering for location names that lie within the search corridor.

12. The method of claim 9, wherein searching the one or more selected data structures comprises a filtering for location names that lie within the search corridor.

13. The method of claim 1, wherein the search corridor stretches from a first country into a second country, and wherein determination of the location data is restricted to locations in the second country.

14. A computer program product comprising a non-transitory computer readable recording medium having program code portions for performing the steps of claim 1 when the computer program product is executed on one or more computing devices.

15. A device for determining location data from a database, the device comprising:
    a display unit configured to display a map;
    an interface configured to receive a first user input in form of a movement of a stylus, a user's finger, or a cursor from a first map area to a second map area spaced apart from the first map area, the movement being a line-shaped trace having a longitudinal extension; and
    a processor with access to the database, wherein the processor is configured to:
    define an extension of a search corridor relative to the displayed map based on the longitudinal extension of the line-shaped trace and by adjusting a corridor width perpendicular to the longitudinal extension based on a velocity of the movement or a pressure on the display unit accompanying the movement; and
    determine, in response to a second user input defining one or more characters, location data of at least one location associated with the one or more characters and lying within the search corridor, wherein the determined location data is displayed.

16. A navigation device comprising:
    the device of claim 15;
    the database in the form of a map database; and
    the display unit in the form of a touchscreen configured to receive at least the first user input from a movement on the touchscreen.

\* \* \* \* \*